(12) United States Patent
Reynolds

(10) Patent No.: US 9,580,609 B2
(45) Date of Patent: *Feb. 28, 2017

(54) AQUEOUS BINDER SOLUTIONS

(71) Applicant: THE CHEMOURS COMPANY FC LLC, Wilmington, DE (US)

(72) Inventor: Richard Alan Reynolds, Middletown, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/370,976

(22) PCT Filed: Jan. 9, 2013

(86) PCT No.: PCT/US2013/020908
§ 371 (c)(1),
(2) Date: Jul. 8, 2014

(87) PCT Pub. No.: WO2013/106488
PCT Pub. Date: Jul. 18, 2013

(65) Prior Publication Data
US 2015/0018466 A1    Jan. 15, 2015

Related U.S. Application Data

(60) Provisional application No. 61/584,350, filed on Jan. 9, 2012.

(51) Int. Cl.
| C08L 79/08 | (2006.01) |
| C09D 179/08 | (2006.01) |
| C09D 7/00 | (2006.01) |
| C09D 5/00 | (2006.01) |
| C09D 181/06 | (2006.01) |
| C08G 73/10 | (2006.01) |
| C08G 73/14 | (2006.01) |

(52) U.S. Cl.
CPC ............. *C09D 7/001* (2013.01); *C09D 5/002* (2013.01); *C09D 179/08* (2013.01); *C09D 181/06* (2013.01); *C08G 73/10* (2013.01); *C08G 73/1046* (2013.01); *C08G 73/14* (2013.01)

(58) Field of Classification Search
CPC ......... C08L 81/06; C08L 79/00; C08G 73/10; C08G 73/1046; C08G 73/14; C09D 179/08
See application file for complete search history.

(56) References Cited

U.S. PATENT DOCUMENTS

| 3,956,241 A | * | 5/1976 | Steele ................. C08G 59/70 526/90 |
| 4,014,834 A | | 3/1977 | Concannon |
| 5,043,418 A | * | 8/1991 | Olson .................. C08K 5/544 528/125 |
| 2006/0240255 A1 | | 10/2006 | Kikuchi et al. |
| 2007/0262426 A1 | | 11/2007 | Mahler |

FOREIGN PATENT DOCUMENTS

| EP | 2428539 A1 | 3/2012 | |
| GB | 1147515 A1 | 4/1969 | |
| GB | 2051664 A1 | 1/1981 | |
| JP | 2000302897 A | * 10/2000 | |
| SG | WO 2009008030 A1 | * 1/2009 | ............ C08J 3/212 |
| WO | 0069984 A1 | 11/2000 | |
| WO | 2007070601 A2 | 6/2007 | |
| WO | 2007070601 A3 | 6/2007 | |
| WO | 2013106488 A1 | 7/2013 | |

OTHER PUBLICATIONS

Machine translated English language equivalent of JP 2000-302897 (Oct. 2000, 6 pages).*
International Search Report and Written Opinion, PCT/US2013/020908, Mailed Apr. 23, 2013.

* cited by examiner

*Primary Examiner* — Brieann R Fink
(74) *Attorney, Agent, or Firm* — Keith W. Palmer

(57) ABSTRACT

The present invention is directed to aqueous systems for polyamideimide, polyether imide, and/or polyamic acid binder solutions. The present invention provides stable aqueous binder solutions equivalent or superior to current aqueous binder solutions.

5 Claims, No Drawings

AQUEOUS BINDER SOLUTIONS

FIELD OF INVENTION

The field of invention is related to alternate solvent systems for polyethersulfone, polyamideimide, polyether imide, polyimide, and/or polyamic acid binder solutions.

BACKGROUND OF INVENTION

Fluoropolymers have found use in many non-stick and release coating applications such as, for example, non-stick coatings for cookware. However, due to the non-stick nature of perfluoropolymers, primer layers having binders are generally needed to adhere to a surface of a substrate prior to application of the fluoropolymers, to enable sufficient adhesion of the fluoropolymer to the substrate. In the art, binder compositions comprising polyethersulfones (PES) or polyamideimides (PAI) or polyetherimides (PEI) or polyimides (PI), or combinations thereof, have been found to be useful in primer layers as film formers and for adhering to both the substrate surface and with perfluoropolymers.

Current binder compositions utilize N-methylpyrrolidone (NMP) as solvent due to its inexpense and solubilizing capabilities. See, for example U.S. Pat. No. 4,014,834 (to Concannon). More recently, the toxicity profile of NMP has been re-evaluated and pending regulations worldwide may minimize or eliminate the use of NMP in such binder solutions. Accordingly, alternative solvents, organic and aqueous based, are needed, which are considered to be more environmentally friendly. Suitable solvents will be capable of solubilizing the binders, including at practical concentrations or binder solids levels, allowing the binders to spread on the surfaces and create a primer layer or film on metal and rubber surfaces without adversely affecting the binder layer or its ability to bind to both the substrate and the fluoropolymer layers. The preferred solution to this problem would be to completely eliminate NMP from such binder solutions and present aqueous binder solutions. Unfortunately, these binder resins are completely insoluble in water. However, a water plus co-solvent approach may be an acceptable replacement for NMP, particularly if the aqueous binder solution is predominantly water, and the co-solvent has a much more favorable toxicity profile than NMP. The present invention meets these needs.

SUMMARY OF THE INVENTION

The present invention is directed to an aqueous binder solution for coating systems comprising a) water, b) polyamideimide or polyether imide, c) an amine, and d) one or more solvent; wherein the one or more solvent comprises one or more of acetoacetamides, guanidines, organic phosphates, piperidones, phthalates, sulfolane, dimethyl sulfone, dialkyl sulfoxide, dl-pantothenyl, n-acetyl-caprolactam, or mixtures thereof.

In an embodiment, the aqueous binder solution comprises a) water, b) polyamideimide or polyether imide, c) an amine, and d) one or more solvent; wherein the one or more solvent comprises acetoacetamides, guanidines, piperidones, dimethyl sulfone, dl-pantothenyl, n-acetylcaprolactam or mixtures thereof.

In one such embodiment, the one or more solvent comprises, acetoacetamide, dimethyl acetoacetamide, n-methyl acetoacetamide, diethyl acetoacetamide, tetramethyl guanidine, dimethyl piperidone, dimethyl sulfone, dl-pantothenyl, n-acetylcaprolactam, or a mixture thereof.

In another such embodiment, the one or more solvent comprises acetoacetamide, dimethyl acetoacetamide, n-methyl acetoacetamide, diethyl acetoacetamide, dimethyl piperidone, dimethyl sulfone, tetramethyl guanidine, or a mixture thereof.

In one such embodiment, the solvent comprises dimethylacetoacetamide.

In another such embodiment, the solvent comprises tetramethyl guanidine.

In another embodiment, the aqueous binder solution comprises a) water, b) polyamideimide or polyether imide, c) an amine, and d) one or more solvent; wherein the one or more solvent is selected from one or more of: acetoacetamides, guanidines, organic phosphates, piperidones, phthalates, sulfolane, dimethyl sulfone, dialkyl sulfoxide, dl-pantothenyl, n-acetylcaprolactam.

In an embodiment, the aqueous binder solution comprises a) water, b) polyamideimide or polyether imide, c) an amine, and d) one or more solvent; wherein the one or more solvent is selected from one or more of: acetoacetamides, guanidines, piperidones, dimethyl sulfone, dl-pantothenyl, n-acetylcaprolactam.

In one such embodiment, the one or more solvent is selected from one or more of: acetoacetamide, dimethyl acetoacetamide, n-methyl acetoacetamide, diethyl acetoacetamide, tetramethyl guanidine, dimethyl piperidone, dimethyl sulfone, dl-pantothenyl, n-acetylcaprolactam, or a mixture thereof.

In another such embodiment, the one or more solvent is selected from acetoacetamide, dimethyl acetoacetamide, n-methyl acetoacetamide, diethyl acetoacetamide, dimethyl piperidone, dimethyl sulfone, tetramethyl guanidine, or a mixture thereof.

In one such embodiment, the solvent is dimethylacetoacetamide.

In another such embodiment, the solvent is tetramethyl guanidine.

For any of the embodiments presented herein there exists an embodiment wherein the c) amine and d) solvent are the same.

For any of the embodiments presented herein there exists an embodiment wherein the c) amine and d) solvent are both tetramethyl guanidine.

For any of the embodiments presented herein there exists an embodiment wherein the aqueous binder solution further comprises one or more of: viscosity modifiers, thinning solvents, binders, pigments, fillers, dispersing aids, surface tension modifiers, and fluoropolymers. In one such embodiment, the thinning solvent is a diether, or an alcohol, or a glycol ether.

Embodiments of the present invention as described in the Summary of the Invention, and any other embodiments described herein, can be combined in any manner where not mutually exclusive.

DETAILED DESCRIPTION

Herein, an aqueous binder solution comprises at least 50% water as a percentage of the total quantity of volatile liquids in the composition (for example, the total amount of water plus all solvents and cosolvents). The solvents and cosolvents used in these aqueous binder solutions are either water miscible, or are used in such small quantities that they do not separate out as a separate phase.

Herein, a thinning solvent is a solvent that, when added to a composition, effects a reduction in viscosity of that composition.

Herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when describing a range.

By "fluoropolymer" it is meant a homopolymer or copolymer with a backbone comprising repeat units of at least one polymerized monomer comprising at least one fluorine atom.

Herein, the term "polyamideimide" (or "PAI") also includes, in the alternative, polyamic acid and salts of polyamic acid from which polyamideimide may be derived.

Herein, viscosity values are measured at room temperature (23° C.) using a Brookfield rotating disc viscometer, such as the Brookfield RVDIII Viscometer.

The present invention is directed to an aqueous binder solution for coating systems comprising a) water, b) polyamideimide or polyether imide, c) an amine, and d) one or more solvent; wherein the one or more solvent comprises acetoacetamides, guanidines, organic phosphates, piperidones, phthalates, sulfolane, dimethyl sulfone, dialkyl sulfoxide, dl-pantothenyl, n-acetylcaprolactam, or mixtures thereof.

The present invention is directed to an aqueous binder solution for coating systems comprising a) water, b) polyamideimide, c) an amine, and d) one or more solvent; wherein the one or more solvent comprises acetoacetamides, guanidines, organic phosphates, piperidones, phthalates, sulfolane, dimethyl sulfone, dl-pantothenyl, n-acetylcaprolactam, or mixtures thereof.

In an embodiment, the aqueous binder solution comprises a) water, b) polyamideimide, c) an amine, and d) one or more solvent; wherein the one or more solvent comprises acetoacetamides, guanidines, piperidones, dimethyl sulfone, dl-pantothenyl, n-acetylcaprolactam or mixtures thereof.

In one such embodiment, the one or more solvent comprises, acetoacetamide, dimethyl acetoacetamide, n-methyl acetoacetamide, diethyl acetoacetamide, tetramethyl guanidine, dimethyl piperidone, dimethyl sulfone, dl-pantothenyl, n-acetylcaprolactam, or a mixture thereof.

In another such embodiment, the one or more solvent comprises acetoacetamide, dimethyl acetoacetamide, n-methyl acetoacetamide, diethyl acetoacetamide, dimethyl piperidone, dimethyl sulfone, tetramethyl guanidine, or a mixture thereof.

In one such embodiment, the solvent comprises dimethylacetoacetamide.

In another such embodiment, the solvent comprises tetramethyl guanidine.

In another embodiment, the aqueous binder solution comprises a) water, b) polyamideimide, c) an amine, and d) one or more solvent; wherein the one or more solvent is selected from one or more of: acetoacetamides, guanidines, organic phosphates, piperidones, phthalates, sulfolane, dimethyl sulfone, dialkyl sulfoxide, dl-pantothenyl, n-acetylcaprolactam.

In an embodiment, the aqueous binder solution comprises a) water, b) polyamideimide, c) an amine, and d) one or more solvent; wherein the one or more solvent is selected from one or more of: acetoacetamides, guanidines, piperidones, dimethyl sulfone, dl-pantothenyl, n-acetylcaprolactam.

In one such embodiment, the one or more solvent is selected from one or more of: acetoacetamide, dimethyl acetoacetamide, n-methyl acetoacetamide, diethyl acetoacetamide, tetramethyl guanidine, dimethyl piperidone, dimethyl sulfone, dl-pantothenyl, n-acetylcaprolactam, or a mixture thereof.

In another such embodiment, the one or more solvent is selected from acetoacetamide, dimethyl acetoacetamide, n-methyl acetoacetamide, diethyl acetoacetamide, dimethyl piperidone, dimethyl sulfone, tetramethyl guanidine, or a mixture thereof.

In one such embodiment, the solvent is dimethylacetoacetamide.

In another such embodiment, the solvent is tetramethyl guanidine.

It is well known that due to the non-stick nature of fluoropolymers, primer layers containing binders are needed to enable the fluoropolyomer to coat the substrate. Examples of fluoropolymers include, but are not limited to, fluoropolymer such as polytetrafluoroethylene (PTFE), fluorinated ethylene propylene (FEP), perfluoroalkoxy (PFA), ethylene tetrafluoroethylene(ETFE). Binders, such as polyethersulfones and polyamideimides, are well known in primer applications for non-stick finishes and can be present at solids levels as high as 70% by weight. In current practice, these binders are solubilized in NMP. Polyethersulfone is an amorphous polymer having a sustained use temperature of up to 190° C. and a glass transition temperature of 220° C. Polyamideimide is thermally stable at temperatures of at least 252° C. and melts at temperatures at least 290° C. Primer layers comprise one or more binders. Primer layers may further comprise a fluoropolymer such as polytetrafluoroethylene (PTFE), fluorinated ethylene propylene (FEP), perfluoroalkoxy (PFA), ethylene tetrafluoroethylene copolymer (ETFE), tetrafluoroethylene-perfluorinated alkyl vinyl ether copolymer, polyvinyl fluoride, polyvinylidene fluoride, polyhexafluoropropylene, ethylene-hexafluoropropylene copolymer, ethylene-vinyl fluoride copolymer, or any combination thereof, for example, which may help enhance adhesion of the fluoropolymer to the primer layer.

To apply the binders to the surface of a substrate, it is convenient for the binder to be adequately solubilized in a solvent or aqueous solution, prior to application. Most applications of binders involve spraying the binder solution onto a surface prior to heating and/or curing. Alternately, the binder solutions can be brushed, dipped, rolled, misted, or applied via any other known application known to those skilled in the art.

Practically speaking, it is desirable to utilize binder solutions wherein the binder is present at a level of at least 5 weight % in the solvent or solvent mixture. However, the binders of choice (PAI, PES, PEI, PI) are insoluble in water and only sparingly soluble in most organic solvents. Moreover, it is further desirable that the binder solutions be available on their own, ready to be supplied and later formulated in primer compositions. For this reason, it is particularly desirable to be able to prepare such "intermediates" at a solids level of at least 30 weight %, and preferably 50 weight %, in the aqueous/cosolvent mixture in order that the aqueous binder solution may be transported and applied economically, for example, to minimize the quantity of water and solvent transported and to minimize the quantity of solvent recycled or remediated upon use. For ease of formulation, the binder intermediates should exist as flowable solutions. That is, the viscosity of the intermediate is preferably stable over time and below 20,000 mPa·s (at 23° C., using a Brookfield rotating disc viscometer, such as the Brookfield RVDIII Viscometer).

Suitable substrates where the present invention may be applied include, but are not limited to, pipes, pots, pans, and rubber rollers.

The above embodiments may further comprise viscosity modifiers, thinners, pigments, fillers, high boiling liquids, dispersing aids, surface tension modifiers, fluoropolymers and other formulation additives.

The co-solvents suitable in the present invention are organic liquids and can be further described by their Hansen solubility parameters. Hansen solubility parameters are discussed in detail in Kirk-Othmer, Encyclopedia of Chemical Technology, second edition, 1963, pp 889-896. Hansen solubility parameters are based on contributions to energy terms from dispersion forces between molecules ($\delta d$), energy from dipolar intermolecular forces between molecules ($\delta p$), and energy from hydrogen bonds between molecules ($\delta h$).

The range of Hansen parameters of candidate co-solvents for aqueous solutions of polyamideimide or polyether imide are listed in Table 1. Examples of candidate co-solvents are listed below (see Table 2). As a first requirement, suitable solvent mixtures useful in the present invention will create stable solutions of the binders (at resin binder solids of at least 10 weight %, and preferably at least 30 weight %, in the aqueous/solvent mixture) and are capable of depositing a uniform film of the polyamideimide and/or polyether imide on a surface of a substrate.

TABLE 1

Hansen parameters of candidate co-solvents for polyamideimide and polyether imide, in $cal^{1/2}cm^{-3/2}$ ($MPa^{1/2}$).

|  | $\delta d$ | $\delta p$ | $\delta h$ |
|---|---|---|---|
| Min | 5.0 (10.2) | 2.2 (4.5) | 2.1 (4.3) |
| Max | 9.9 (20.3) | 9.5 (19.4) | 7.7 (15.7) |

For aqueous binder solutions, the solutions comprise polyamideimide or polyether imide, water, an amine, and one or more solvent. Examples of suitable amines, include but are not limited to, triethylamine, dimethyl ethanolamine, ethyl 2-hydroxyethyl amine, tributyl amine, tris(2-hydroxyethyl) amine, N,N-dimethylaniline, morpholine, pyridine, N-methyl pyrrole, ethyl bis(2-hydroxyethyl)amine, tetramethyl guanidine and mixtures thereof. Examples of suitable solvents include, but are not limited to, dl-pantothenyl, n-acetylcaprolactam, 1,3-dimethyl-2-imidazolinone (N,N dimethylethyleneurea), gamma-valerolactone, trimethyl phosphate, triethylphosphate, delta-valerolactam, epsilon-caprolactam, N-methylcaprolactam, acetoacetamide, dimethyl acetoacetamide, N-methyl acetoacetamide, dimethyl piperidone, diethyl acetoacetamide, dimethyl sulfone, tetramethyl guanidine, or a mixture thereof.

The amine and solvent can be the same or different. For example, the aqueous solution can be polyamideimide, water and tetramethyl guanidine, where tetramethyl guanidine serves as both the amine and the solvent. Similarly, for a polyether imide binder solution.

For aqueous polyamideimide binder solutions, the solvent mixture (water plus solvents) is present from 30 to 90%, preferably 30 to 75%, of the total composition. In one embodiment, solvent systems comprise two organic solvents. The two organic solvents may be present at a 50:50 ratio, preferably at 90:10 ratio.

In certain embodiments, viscosity modifier and thinning solvents are needed to enhance the spreadability of the solution on the surface of the substrate. Suitable viscosity modifiers and thinning solvents are any liquid that reduce the viscosity of the solvent without adversely reacting with or affecting the binder. Examples of viscosity modifiers include, but are not limited to, 1-butanol, 2-propanol, triethylene glycol, propyl propionate, propylene glycol methyl ether, propylene glycol propyl ether, ethyl acetate, and mixtures thereof.

In any of the above embodiments, binder solutions can be made with various solvents as defined above to enable application of the binder solution to a surface of a substrate, and also allow easy removal of the solvent to form a primer layer. Suitable solvents will also solubilize additional components such as viscosity modifiers, thinners, pigments, fillers, high boiling liquids, dispersing aids, surface tension modifiers, and fluoropolymers and other additives that, when present, enhance primer performance.

The binder solutions of the current invention are useful in coatings, particularly in primers for non-stick fluoropolymer coatings, such as primers for non-stick cookware. The binder solutions also find use in other coating applications, such as, for example, base coats in the interior of metered dose inhalers (as used, for example, on interior surfaces of inhalers for asthma medication).

EXAMPLES

Aqueous Resin Solutions

The procedure for preparing an aqueous polyamideimide-based primer or polyether imide-based primer or one-coat system is as follows:

In order to make polyamideimide soluble in water, and thereby capable of being used in an aqueous-based coating, the polyamideimide was first converted to a polyamic acid-amine salt. The raw PAI powder was reacted with an amine, most commonly with a tertiary amine such as triethylamine, at an elevated temperature, between 35-65° C. for a period of 6 hours, in a mixture of water and the candidate solvent, wherein the latter serves to catalyze/accelerate the reaction. This process creates a water soluble resin of amine-neutralized polyamic acid.

The amine-neutralized polyamic acid was added into a mixing vessel containing water and with a paddle stirrer. The amine-neutralized polyamic acid was added and stirred with a paddle stirrer (room temperature) until fully dissolved and uniform to ensure solubility. If desired, enough pigment dispersion was added to create any color desired, and stirred. Similarly, if required, an amount of fluoropolymer powder or pre-milled fluoropolymer was added, and stirred, followed by addition of any additives for abrasion resistance, improved wetting or adhesion, appearance, or other performance qualities, and the composition stirred until uniform. The PAI remains in the amine-neutralized polyamic acid form until the final curing at elevated temperature to give the dry film; the amine component is driven off in the cure and the PAI is re-formed.

Typical aqueous binder solutions, as intermediates, have the composition:
20-40% water
20-40% resin binder (PAI or PEI)
5-15% amine
5-20% NMP-replacement solvent 5-20% co-solvent (thinning solvent)

Similar procedures may be used to prepare aqueous polyether imide-based coating compositions.

In determining whether a given solvent may be a suitable candidate as a co-solvent for the resin, from the practical standpoint of use in a coatings formulation, it was considered that the resin should be soluble to at least an extent of 10% in a given solvent. Desirably, the resin should be soluble to an extent of 30% in a given.

Examples 1 to 21 were prepared using 10 g of the resin (Torlon™ AI-10 obtained from Solvay SA, Brussels, Belgium for PAI; or Ultem™ 1000 from SABIC International, Riyadh, Saudi Arabia for PEI), and then adding the solvent in sufficient quantity to bring the total weight resin and solvent to 100 g.

For the solubility determinations shown in Table 2, no other formulation components were included (no pigment or fluoropolymer or formulation additives). The mixture was stirred for 6 hours at room temperature before decanting off the supernatant liquid and drying at 200° C. for 30 minutes. The weight of dried solid was subtracted from the original 10 g sample to determine the approximate amount of resin soluble in a 100 g solution. For the case in which no dried solids are left, it was considered that the resin is soluble to an extent of at least 10 g of resin per 100 g of resin solution, which was designated a score of 10. As an example, if 4.0 g of dried resin solids were left, it was considered that 6.0 g of resin was solubilized by the solvent, which was designated a score of 6 (meaning approximately 6 weight % resin in the solvent solution). The test was performed using PAI for each candidate co-solvent and the score (0-10) recorded. The score corresponds to the approximate weight % of resin soluble in the solvent, except that a score of 10 indicates a solubility of at least 10 wt % resin in the solvent would be possible.

TABLE 2

PAI resin content in 100 g resin/solvent solution composition and Hansen parameters

| Ex. | PAI % | Solvent | ∂d | ∂p | ∂h |
|---|---|---|---|---|---|
| 1 | 10 | 2-pyrrolidinone | 9.5 | 8.5 | 5.5 |
| 2 | 10 | DMAC (dimethylacetamide) | 8.2 | 5.6 | 5.0 |
| 3 | 10 | DMF (dimethylformamide) | 8.5 | 6.7 | 5.5 |
| 4 | 10 | NEP (N-ethyl pyrrolidone) | 8.8 | 5.9 | 3.4 |
| 5 | 4.5 | vinyl caprolactam | 8.8 | 5.8 | 3.0 |
| 6 | 10 | 5-methyl-2-hydroxyethyl pyrrolidone | 9.1 | 4.5 | 6.7 |
| 7 | 5 | 5-methyl-2-pyrrolidinone | 9.6 | 7.4 | 3.9 |
| 8 | 10 | 1,5 dimethyl pyrrolidone | 8.1 | 4.4 | 3.0 |
| 9 | 10 | dimethyl propylene urea | 9.1 | 7.8 | 4.0 |
| 10 | 10 | tetramethylurea | 8.2 | 4.0 | 5.4 |
| 11 | 0 | sulfolane | 9.9 | 8.9 | 5.3 |
| 12 | 10 | Xolvone (dimethyl piperidone) | 8.3 | 5.2 | 3.6 |
| 13 | 10 | NVP (N-vinyl pyrrolidone) | 8.0 | 4.5 | 2.9 |
| 14 | 1.5 | LP100 (octyl pyrrolidone) | 8.5 | 2.7 | 2.3 |
| 15 | 0 | dimethyl phthalate | 9.1 | 5.3 | 2.4 |
| 16 | 10 | N-methylcaprolactam | 8.5 | 2.2 | 2.1 |
| 17 | 2 | diethyl acetoacetamide | 8.2 | 4.0 | 2.9 |
| 18 | 1 | tetramethyl guanidine | N/A | N/A | N/A |
| 19 | 9 | trimethyl phosphate | 8.2 | 7.8 | 5.0 |
| 20 | 9 | triethylphosphate | 8 | 5.6 | 4.5 |
| 21 | 0 | furfural | 9.1 | 7.3 | 2.5 |
| A | 10 | NMP | 8.8 | 6.0 | 3.5 |

Although, in some cases, promising from the viewpoint of solubility characteristics, the following solvents were ruled out of consideration for use in commercial systems due to an unfavorable toxicity profile: 2-pyrrolidinone, DMAC (dimethylacetamide), DMF (dimethylformamide), NEP (N-ethyl pyrrolidone), vinyl caprolactam, 5-methyl-2-hydroxyethyl pyrrolidone, 5-methyl-2-pyrrolidinone, 1,5 dimethyl pyrrolidone, tetramethylurea, NVP (N-vinyl pyrrolidone), N-methylcaprolactam, and furfural. Additionally, sulfolane, LP-100 (octyl pyrrolidone), and dimethyl phthalate were ruled out due to their inability to solubilize PAI or PEI to any significant extent.

The remaining candidates were tested in coatings applications. The primary purpose of these binders in fluoropolymer coatings is as a primer layer to provide adhesion of the coating to the substrate (which, in turn, requires adhesion of the primer to the substrate and adhesion of the primer to the fluoropolymer coating layer applied on top of the primer). The remaining candidate binder solutions were evaluated in an industry test for adhesion to the substrate, the Cross Hatch Tape Adhesion test (CHTA test), as well as an adhesion/abrasion resistance test, the Mechanical Tiger Paw test (MTP test).

All of the tested resin solutions produced smooth coatings.

Test Procedure—Cross Hatch Tape Adhesion Test (ASTM D3359)

The test procedure follows that of ASTM D3359-92a. For the purpose of completing a basic screening of solvents for replacement of NMP, an unfilled blue primer was used with a basic PTFE topcoat at relative film thicknesses of 0.3 and 0.4 mils.

Basic composition of Aqueous Primer:
55-65% Water
5-6% PAI
2-5% NMP Replacement
2-6% Co-solvent
5-10% Surfactant
1-4% Amine
5-10% Fluoropolymer
5-10% Pigment
0-10% Other additives Basic Composition of Aqueous Topcoat
35-65% Water
30-45% Fluoropolymer
7-12% Surfactant
0-10% Other additives Coatings were applied by spraying to smooth aluminum fry pans using a 2-stage process: (a) the primer coating was sprayed on the pan, and dried at 150° F. (65.5° C.) for 5 minutes; (b) the topcoat was sprayed on the primer, and cured at 800° F. (427° C.; measured metal temp) for 10 minutes. The dry film is scored with a blade through the coating to the bare metal with a grid template having 1 mm spacings. Eleven parallel cuts were made with the crosshatch template, which procedure was then repeated at a right angle to the first series of cuts, in order to produce a grid of 100 squares in the coating. Adhesive tape (Scotch Tape, 3M, St. Paul, Minn., USA) is pressed down evenly on each coating surface over the scored area, and then pulled up evenly at a 90 degree angle. Adhesion to the substrate was evaluated according to the amount of the paint film that was removed or lifted by the tape as follows:

Rating "A"—all incisions are smooth, and there is no loss of adhesion in the squares, in the corners, or at the points of intersection of the cuts.

Rating "B"—slight peeling is found at the point of intersection of the cuts.

Rating "C"—there is substantial loss of adhesion along the points of intersection of the cuts and adhesion loss in the squares.

Rating "D"—complete loss of adhesion.

Test Procedure—Mechanical Tiger Paw Test

The Mechanical Tiger Paw test (MTP test) consists of heating a coated pan or disc to approximately 400 F (204° C.), and creating a wear pattern by moving a weighted, rotating head with 3 ballpoint pen refills, back and forth over the surface. A fresh pan (rating=10) is run until the test is complete when a contiguous "breakthrough" of the coating down to the metal substrate is observed (rating=5). The longer it takes to reach a rating of "5", the better the wear resistance of the coating. The MTP test result is measured in minutes.

TABLE 3

Effect of Formulation Co-solvent on Film Properties (Adhesion and Abrasion Resistance) for Aqueous Binder Solutions

| Example | Solvent Name | CHTA | MTP |
|---|---|---|---|
| 1 | NMP | A | 55 |
| 2 | dimethyl piperidone (Xolvone) | B | 48 |
| 3 | dimethylpropylene urea | B | 47 |
| 4 | dimethyl acetoacetamide | A | 58 |
| 5 | diethyl acetoacetamide | B | 31 |
| 6 | acetoacetamide | A | 79 |
| 7 | tetramethylguanidine | A | 70 |
| 8 | N-methyl acetoacetamide | A | 51 |
| 9 | dimethylsulfone | A | 50 |

A requirement of any replacement binder solution is that it must have equal or better performance in adhesion and abrasion resistance tests compared to the current aqueous binder solutions that utilize NMP. A CHTA rating of "B" is considered unacceptable, as is an MTP result of less than 55 minutes. The following candidate co-solvents failed to produce aqueous binder solutions that result in sufficient adhesion to the substrate: dimethyl piperidone (Xolvone), dimethylpropylene urea, and diethyl acetoacetamide; and, of the remainder, the following candidate co-solvents failed to produce aqueous binder solutions that result in sufficient abrasion resistance: N-methyl acetoacetamide and dimethylsulfone. Preferred co-solvents that produce aqueous binder solutions that result in good adhesion to the substrate and good abrasion resistance include: dimethyl acetoacetamide, acetoacetamide, and tetramethylguanidine. For the preferred co-solvents, aqueous binder solutions comprising polyether imide were also prepared and found to produce smooth coatings with good adhesion to the substrate and good abrasion resistance. For ease of handling and availability, the most preferred co-solvents for use in aqueous binder solutions of polyamideimide or polyether imide is dimethyl acetoacetamide.

What is claimed is:

1. An aqueous binder solution comprising a) water, b) polyamideimide or polyether imide, c) an amine, and d) solvent comprising acetoacetamides.

2. An aqueous binder solution of claim 1 further comprising one or more of: viscosity modifiers, thinning solvent, binders, pigments, fillers, dispersing aids, surface tension modifiers, and fluoropolymers.

3. The aqueous binder solution of claim 2 wherein the thinning solvent is a diether, an alcohol, or a glycol ether.

4. The aqueous binder solution of claim 1, wherein the solvent is selected from acetoacetamide, dimethyl acetoacetamide, n-methyl acetoacetamide, diethyl acetoacetamide, or a mixture thereof.

5. The aqueous binder solution of claim 1 wherein the solvent comprises dimethylacetoacetamide.

* * * * *